Patented Sept. 5, 1922.

1,428,084

UNITED STATES PATENT OFFICE.

JAMES H. GRAVELL, OF ELKINS PARK, PENNSYLVANIA.

CLEANER FOR AND METHOD OF CLEANING METAL.

No Drawing. Application filed June 4, 1921. Serial No. 475,166.

*To all whom it may concern:*

Be it known that I, JAMES H. GRAVELL, a citizen of the United States, residing at Elkins Park, in the county of Montgomery and State of Pennsylvania, have invented a new and useful Improvement in Cleaners for and Methods of Cleaning Metals, of which the following is a specification.

The object of the invention is to satisfactorily and thoroughly free the metal from corrosion and oil or grease, and to put it in a condition suitable for receiving a protecting coating, such, for instance, as a coat of paint.

It has been the custom to clean metals by the aid of acid, and sulphuric, nitric, hydrochloric and phosphoric acids are well known for this purpose and when the metal is free from oils and grease the action of these acids is satisfactory, but when this is not the case difficulty is experienced because the acids do not properly wet the metal.

I have discovered that when metal is treated with acid in the presence of clay any oil film or layer of grease on the metal is removed, thereby allowing the acid to contact with and act directly on the metal. The action of the clay depends to some extent on the size of its component particles, the best clay for the purpose being what is known as colloidal clay or clay in which the particles forming the mass are extremely small.

Dry acids, such as oxalic and citric may be mixed with dry clay and stored until ready for use when the admixture may be moistened with water and the paste so formed applied to the metal and wet acids may be mixed with the clay to form a paste, or in each case more water may be added to form a liquid cleaner.

When the cleaner is applied to vertical surfaces the surfaces drain readily leaving but thin film of the cleaner on the surface, but I find that the thickness of this film may be increased by the addition of boiled starch or of a starch derivative, or of other materials, such as dextrine and gums having the same properties as starch, and which are not deliquescent and are carbohydrates.

The cleaner as described above works to the best advantage when it is scrubbed on the surface, the mechanical action working to advantage in the formation of an intimate association of the oil or grease with the clay. I find, however, that the addition of acetone, methyl alcohol, or ethyl alcohol tends to reduce the amount of mechanical action required. (In the claims, the term "ethyl alcohol" is used to include the equivalents of this material such as acetone, denatured alcohol, methyl alcohol and the like). If in addition to these materials, a higher alcohol such as amylic or butyl, is added, the mechanical action may be entirely dispensed with.

I have found that any of the well known acids that are compatible with the various ingredients work well. Nitric acid of course cannot be used when the formula includes any of the alcohols or starch as it is then not compatible. Hydrofluoric acid acts on the clay, and being incompatible, cannot be used.

In some cases where my cleaner is used for preparing metal for painting, I prefer to use phosphoric acid not only because it dissolves rust, but also because it has the property of not causing rust. Furthermore it can be used with safety for this purpose.

In its simplest form my cleaner for example may be composed as follows:

Oxalic acid (powdered) -------- 10 pounds.
Clay -------------------------- 1 pound.

These may be intimately mixed, boxed and stored. When the admixture is to be used it is made up with water to make the acid active and to form a paste, or more water may be used to form a liquid. It is best applied with a scrubbing brush.

Another simple admixture suitable for preparing steel for painting may be formed as follows:

85% ortho phosphoric acid --- 1.00 gallon.
Water ------------------------ 2.00 gallons.
Colloidal clay --------------- 1.50 pounds.

The metal may be scrubbed with this material. If the surface being treated is vertical so that liquid tends to flow away, the film of liquid retained on the metal may be increased by the addition of a filler such as boiled or soluble starch or dextrine, so that the admixture becomes

| | |
|---|---|
| 85% ortho phosphoric acid | 1.00 gallon. |
| Water | 2.00 gallons. |
| Colloidal clay | 1.50 pounds. |
| Starch derivative | 0.75 pounds. |

The scrubbing action may be diminished by the addition of alcohol as follows:

| | |
|---|---|
| 85% ortho phosphoric acid | 1.00 gallon. |
| Water | 2.00 gallons. |
| Colloidal clay | 1.50 pounds. |
| Starch derivative | 0.75 pounds. |
| Alcohol which may be denatured | 0.60 gallons. |

If it is desired to entirely eliminate the scrubbing action and simply paint the cleaner on the metal, a higher alcohol such as butyl or fusel oil may be added as follows:

| | |
|---|---|
| 85% ortho phosphoric acid | 1.00 gallon. |
| Water | 2.00 gallons. |
| Colloidal clay | 1.50 pounds. |
| Starch derivative | 0.75 pounds. |
| Alcohol which may be denatured | 0.60 gallons. |
| Butyl alcohol | 0.20 gallons. |

Assuming that the last given formula is to be used and that the work to be cleaned is a steel automobile body which is to be painted the method of processing the work would be as follows:

The cleaner is applied to the work with a brush. It is allowed to remain on the work a few minutes to act on the dirt, rust and oil. During this time the action of the cleaner may be assisted by scouring the heavily rusted spots with steel wool or other abrasive. When the surface has been cleaned to satisfaction the metal may be wiped dry with a dry cloth or it may be washed with water and then dried with a cloth, the object to be kept in mind being the removal of the cleaner and the products of its reaction. The surface is allowed then to thoroughly air dry and when perfectly dry it may be painted.

The formulas given are merely examples embodying the spirit of my invention and may be altered by substituting chemical equivalents or the proportions of the several ingredients may be altered without materially affecting the action of the composition otherwise than to increase or diminish the effects of the various ingredients.

I claim:

1. A cleaner for metals consisting of clay and a compatible metal etching acid.

2. A cleaner for metals consisting of colloidal clay and a compatible metal etching acid.

3. A cleaner for metals consisting of colloidal clay, a compatible metal etching acid, and water.

4. A cleaner for metals consisting of colloidal clay, a compatible metal etching acid, water, and a filler.

5. A cleaner for metals consisting of colloidal clay, a compatible metal etching acid, water, a filler, and ethyl alcohol.

6. A cleaner for metals consisting of colloidal clay, a compatible metal etching acid, water, a filler, ethyl alcohol, and an alcohol of higher boiling point.

7. A cleaner for metals consisting of colloidal clay a compatible metal etching acid, water, a filler, acetone, and an alcohol of higher boiling point than ethyl alcohol.

8. A cleaner for metals consisting of colloidal clay, phosphoric acid, water, a nondeliquescent carbohydrate soluble in the admixture, ethyl alcohol and fusel oil.

9. A cleaner for iron and steel consisting of colloidal clay, ortho phosphoric acid, starch, denatured alcohol, and butyl alcohol.

10. The method of cleaning metal consisting in treating it with a metal etching acid in the presence of clay.

11. The method of cleaning metal consisting in treating it with a metal etching acid in the presence of colloidal clay.

12. The method of cleaning metal consisting in treating it with a metal etching acid in the presence of colloidal clay, allowing the clay and acid to act on the metallic surface, and then removing the clay and acid together with the products of the reaction.

13. The method of cleaning metal consisting in treating it with a metal etching acid in the presence of colloidal clay, and then washing the metal with water.

14. The method of preserving steel and iron consisting in treating it with a metal etching acid in the presence of colloidal clay, washing the metal with water, allowing the metal to dry, and then applying a coat of paint.

JAMES H. GRAVELL.